(12) United States Patent
Hong et al.

(10) Patent No.: US 11,533,171 B2
(45) Date of Patent: Dec. 20, 2022

(54) APPARATUS AND METHOD FOR QUANTUM DIRECT COMMUNICATION USING SINGLE QUBITS

(71) Applicant: ELECTRONICS AND TELECOMMUNICATIONS RESEARCH INSTITUTE, Daejeon (KR)

(72) Inventors: Changho Hong, Seoul (KR); Nayoung Kim, Daejeon (KR); Osung Kwon, Daejeon (KR); Younchang Jeong, Ulsan (KR); Se Wan Ji, Seoul (KR); Jingak Jang, Daejeon (KR); Daesung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 576 days.

(21) Appl. No.: 16/554,850

(22) Filed: Aug. 29, 2019

(65) Prior Publication Data
US 2020/0313879 A1    Oct. 1, 2020

(30) Foreign Application Priority Data
Mar. 27, 2019    (KR) .................. 10-2019-0035107

(51) Int. Cl.
*H04L 29/00*    (2006.01)
*H04L 9/08*    (2006.01)
*G06N 10/00*    (2022.01)

(52) U.S. Cl.
CPC ........... *H04L 9/0852* (2013.01); *G06N 10/00* (2019.01)

(58) Field of Classification Search
CPC .............................. H04L 9/0852; G06N 10/00
(Continued)

(56) References Cited

U.S. PATENT DOCUMENTS

| 2010/0239250 | A1* | 9/2010 | Gisin | H04L 9/0858 380/256 |
|---|---|---|---|---|
| 2017/0054556 | A1* | 2/2017 | Fu | H04W 12/06 |
| 2018/0069698 | A1 | 3/2018 | Hong et al. | |

FOREIGN PATENT DOCUMENTS

| KR | 10-2018-0025621 A | 3/2018 |
|---|---|---|
| KR | 10-2018-0027275 A | 3/2018 |

OTHER PUBLICATIONS

Ruoyang Qi et al., "Implementation and security analysis of practical quantum secure direct communication," Science & Applications (Feb. 6, 2019).

(Continued)

*Primary Examiner* — Brandon Hoffman
*Assistant Examiner* — Michael D Anderson
(74) *Attorney, Agent, or Firm* — LRK Patent Law Firm (57) ABSTRACT

An apparatus and method for quantum direct communication using single qubits. The apparatus includes a quantum state preparation unit for preparing quantum states including a message state prepared using pairs of single qubits based on a bit of a message to be sent to a communication partner, an authentication state prepared using random qubit pairs, and a verification state prepared using random qubit pairs, a quantum state communication unit for transmitting the quantum states to the communication partner and measuring a quantum state of a message received from the communication partner, an authentication unit for authenticating, using the authentication state, the communication partner depending on whether an authentication key previously shared with the communication partner is possessed, a verification unit for verifying security of a quantum channel using the (Continued)

verification state, and a message restoration unit for restoring the received message using the message state.

16 Claims, 4 Drawing Sheets

(58) Field of Classification Search
USPC .......................................................... 713/168
See application file for complete search history.

(56) References Cited

OTHER PUBLICATIONS

Fu-Guo Deng et al., "Secure direct communication with a quantum one-time pad," Physical Review A 69, 052319 (2004).
Chitra Shukla et al., "Semi-quantum communication: Protocols for key agreement, controlled secure direct communication and dialogue," Quantum Information Processing, Feb. 2017.

* cited by examiner

APPARATUS AND METHOD FOR QUANTUM DIRECT COMMUNICATION USING SINGLE QUBITS

CROSS REFERENCE TO RELATED APPLICATION

This application claims the benefit of Korean Patent Application No. 10-2019-0035107, filed Mar. 27, 2019, which is hereby incorporated by reference in its entirety into this application.

BACKGROUND OF THE INVENTION

1. Technical Field

The present invention relates generally to quantum communication technology, and more particularly, to application technology for quantum cryptography communication.

2. Description of the Related Art

In comparison with quantum cryptography communication, in modern cryptography communication, the secure sending and reception of messages presumes a key previously shared between communicating parties as a precondition. A quantum direct communication technique may perform secure communication without a key previously shared between users using quantum states. That is, the quantum direct communication technique may securely send and receive messages even in the presence of attacks made by a third party.

Most existing quantum direct communication techniques use quantum entanglement states as quantum sources. However, current technology for generating quantum entanglement states has technical limitations in application to an actual communication environment because generation efficiency is very low and the states are maintained for a short period of time, and thus a lot of research is currently required. Therefore, existing quantum direct communication techniques are idealized techniques for realizing secure communication, but they are difficult to implement in practice.

Also, in existing quantum direct communication techniques, entity authentication for a communication partner is not performed in advance, and thus a problem may arise in secure communication.

Therefore, the present invention proposes a secure quantum direct communication technique including entity authentication by employing single qubits that can be easily implemented as sources.

Meanwhile, Korean Patent Application Publication No. 10-2018-0025621 entitled "Apparatus and method for path superposition-based quantum secure direct communications" discloses an apparatus and method for path superposition-based quantum secure direct communication, which use the polarization and phase of a single photon as two types of bases, thus enhancing security compared to existing quantum cryptography protocols.

SUMMARY OF THE INVENTION

Accordingly, the present invention has been made keeping in mind the above problems occurring in the prior art, and an object of the present invention is to provide secure communication without information previously shared between users who desire communication by utilizing quantum states.

Another object of the present invention is to propose an apparatus and method that enable quantum direct communication to be easily implemented.

A further object of the present invention is to provide secure communication between legitimate users by integrating entity authentication with a quantum direct communication technique.

In accordance with an aspect of the present invention to accomplish the above objects, there is provided an apparatus for quantum direct communication using single qubits, including a quantum state preparation unit for preparing quantum states including a message state prepared using pairs of single qubits based on a message bit of a message to be sent to a communication partner, an authentication state prepared using random qubit pairs, and a verification state prepared using random qubit pairs; a quantum state communication unit for transmitting the quantum states to the communication partner, and measuring a quantum state of a message received from the communication partner when the message is received from the communication partner;

an authentication unit for authenticating the communication partner based on determination of whether an authentication key previously shared with the communication partner is possessed using the authentication state; a verification unit for verifying security of a quantum channel for communicating with the communication partner using the verification state; and a message restoration unit for restoring the message received from the communication partner using the message state.

The quantum state preparation unit may prepare quantum states in which quantum qubit pairs corresponding to the message state, the authentication state, and the verification state are randomly mixed.

The authentication unit may be configured to, when a message is sent to the communication partner, notify the communication partner of a location of a qubit pair corresponding to the authentication state, among qubit pairs included in the quantum states, and determine whether the authentication key previously shared with the communication partner is possessed based on results of performing an operation by the communication partner.

The authentication unit may be configured to, when a message is received from the communication partner, reveal results of performing an XOR operation between a location of a qubit pair corresponding to the authentication state, notification of which is provided by the communication partner, and a key previously shared with the communication partner, to the communication partner.

The verification unit may be configured to, when a message is sent to the communication partner, notify the communication partner of a location of a qubit pair corresponding to the verification state, among qubit pairs included in the quantum states, and determine security of the quantum channel using results of performing an operation by the communication partner.

The verification unit may be configured to, when a message is received from the communication partner, reveal results of measurement performed using a verification basis at a location of a qubit pair corresponding to the verification state, notification of which is provided by the communication partner, to the communication partner.

The verification unit may be configured to check results of measurement performed using the verification basis and results of measurement performed using a basis identical to that of an initial state prepared by the quantum state preparation unit, thus determining security of the quantum channel.

The message restoration unit may be configured such that, when a message is received from the communication partner, results of measurement at a location performed using a basis identical to a preparation basis revealed by the communication partner, among results of measurement of remaining qubit pairs, are restored as the message, after the communication partner has been authenticated and security of the quantum channel has been verified, wherein the remaining qubit pairs are qubit pairs other than a qubit pair used for authentication of the communication partner in the quantum channel and a qubit pair used for verification of security of the quantum channel.

In accordance with an aspect of the present invention to accomplish the above objects, there is provided a method for quantum direct communication using single qubits, the method being performed by an apparatus for quantum direct communication using single qubits, the method including preparing quantum states including a message state prepared using pairs of single qubits based on a message bit of a message to be sent to a communication partner, an authentication state prepared using random qubit pairs, and a verification state prepared using random qubit pairs; transmitting the quantum states to the communication partner, and measuring a quantum state of a message received from the communication partner when the message is received from the communication partner; authenticating the communication partner based on determination of whether an authentication key previously shared with the communication partner is possessed using the authentication state; verifying security of a quantum channel for communicating with the communication partner using the verification state; and restoring the message received from the communication partner using the message state.

Preparing the quantum states may be configured to prepare quantum states in which quantum qubit pairs corresponding to the message state, the authentication state, and the verification state are randomly mixed.

Authenticating the communication partner may be configured to, when a message is sent to the communication partner, notify the communication partner of a location of a qubit pair corresponding to the authentication state, among qubit pairs included in the quantum states, and determine whether the authentication key previously shared with the communication partner is possessed based on results of performing an operation by the communication partner.

Authenticating the communication partner may be configured to, when a message is received from the communication partner, reveal results of performing an XOR operation between a location of a qubit pair corresponding to the authentication state, notification of which is provided by the communication partner, and a key previously shared with the communication partner, to the communication partner.

Verifying the security of the quantum channel may be configured to, when a message is sent to the communication partner, notify the communication partner of a location of a qubit pair corresponding to the verification state, among qubit pairs included in the quantum states, and determine security of the quantum channel using results of performing an operation by the communication partner.

Verifying the security of the quantum channel may be configured to, when a message is received from the communication partner, reveal results of measurement performed using a verification basis at a location of a qubit pair corresponding to the verification state, notification of which is provided by the communication partner, to the communication partner.

Verifying the security of the quantum channel may be configured to check results of measurement performed using the verification basis and results of measurement performed using a basis identical to that of an initial state prepared by a quantum state preparation unit, thus determining security of the quantum channel.

Restoring the message may be configured such that, when a message is received from the communication partner, results of measurement at a location performed using a basis identical to a preparation basis revealed by the communication partner, among results of measurement of remaining qubit pairs, are restored as the message, after the communication partner has been authenticated and security of the quantum channel has been verified, wherein the remaining qubit pairs are qubit pairs other than a qubit pair used for authentication of the communication partner in the quantum channel and a qubit pair used for verification of security of the quantum channel.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present invention will be described in detail with reference to the attached drawings.

Figure 1:
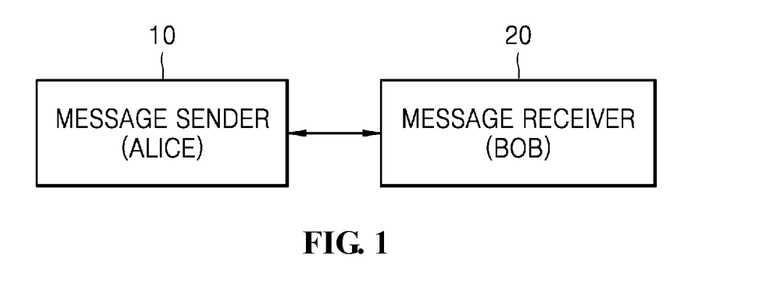
FIG. 1 is a block diagram illustrating a system for quantum direct communication using single qubits according to an embodiment of the present invention.

FIG. 1 is a block diagram illustrating a system for quantum direct communication using single qubits according to an embodiment of the present invention.

Referring to FIG. 1, the system for quantum direct communication using single qubits according to the embodiment of the present invention may perform quantum direct communication between Alice, who is a message sender, and Bob, who is a message receiver.

The message sender Alice may correspond to an apparatus 10 for quantum direct communication using a first single qubit on a sending side.

The message receiver Bob may correspond to an apparatus 20 for quantum direct communication using a second single qubit on a receiving side.

Here, the quantum states used for communication according to the embodiment of the present invention may be defined as follows.

The quantum states initially transmitted from Bob to Alice may be represented by the following Equation (1):

$$|ini\rangle_i = \{|0\rangle, |1\rangle, |+\rangle, |-\rangle\} \quad (1)$$

Here, $|ini\rangle_i$ may be represented by matrices, as shown in the following Equation (2):

$$|0\rangle = \begin{pmatrix}1\\0\end{pmatrix}, |1\rangle = \begin{pmatrix}0\\1\end{pmatrix}, |+\rangle = \begin{pmatrix}1\\1\end{pmatrix}, |-\rangle = \begin{pmatrix}1\\-1\end{pmatrix} \quad (2)$$

The states may be classified as shown below depending on the bases.

σz-basis={|0⟩, |1⟩}, σx-basis={|+⟩, |−⟩}

The relationship between quantum states may be given by the following Equation (3):

$$|+\rangle = \frac{1}{\sqrt{2}}(|0\rangle + |1\rangle), |-\rangle = \frac{1}{\sqrt{2}}(|0\rangle - |1\rangle) \quad (3)$$

$$|0\rangle = \frac{1}{\sqrt{2}}(|+\rangle + |-\rangle), |1\rangle = \frac{1}{\sqrt{2}}(|+\rangle - |-\rangle)$$

In this case, the two users Alice and Bob may share an authentication key $K_{AB} = (k_{AB1}, k_{AB2}, \ldots, k_{ABm})$ so that they can authenticate each other.

Figure 2:
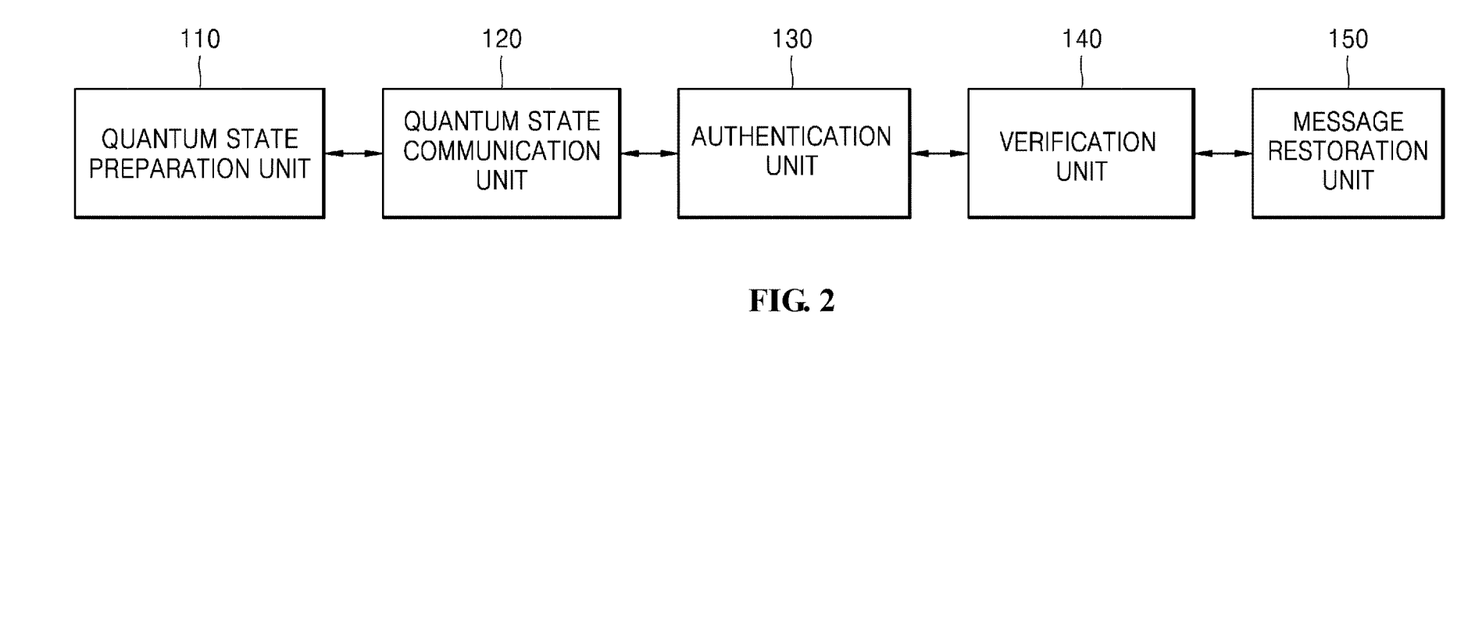
FIG. 2 is a block diagram illustrating an apparatus for quantum direct communication using single qubits according to an embodiment of the present invention.

FIG. 2 is a block diagram illustrating an apparatus for quantum direct communication using single qubits according to an embodiment of the present invention.

Referring to FIG. 2, the apparatus for quantum direct communication using single qubits according to the embodiment of the present invention includes a quantum state preparation unit 110, a quantum state communication unit 120, an authentication unit 130, a verification unit 140, and a message restoration unit 150.

The quantum state preparation unit 110 may prepare quantum states including a message state which is prepared using a pair of single qubits based on the message bit of a message to be sent to a communication partner, an authentication state which is prepared using random qubit pairs, and a verification state which is prepared using random qubit pairs.

Here, in the case of the sending side Alice, the quantum state preparation unit 110 may prepare single qubit pairs depending on the message bit desired to be sent.

That is, when the message bit desired to be sent is 0, the quantum state preparation unit 110 may prepare $(|0\rangle, |0\rangle)$ or $(|+\rangle, |+\rangle)$.

Here, when the message bit desired to be sent is 1, the quantum state preparation unit 110 may prepare $(|1\rangle, |1\rangle)$ or $(|-\rangle, |-\rangle)$.

Here, the quantum state preparation unit 110 may randomly select single qubit pairs depending on the message bit.

For example, when a message bit sequence is 11010, the quantum state preparation unit 110 may prepare a message state, such as that shown in Equation (4):

$$\{(|-\rangle,|-\rangle),(|1\rangle,|1\rangle),(|+\rangle,|+\rangle),(|1\rangle,|1\rangle), \\ (|0\rangle,|0\rangle)\} \quad (4)$$

Here, the message state may be represented by the following Equation (5):

$$|msg\rangle = [(|msg\rangle_1, |msg\rangle_1), (|msg\rangle_2, |msg\rangle_2), \ldots, (|msg\rangle_n, |msg\rangle_n)] \quad (5)$$

Also, in the case of the sending side Alice, the quantum state preparation unit 110 may prepare quantum states obtained by randomly selecting one from among qubit pairs given in Equation (6) so as to authenticate the receiving side Bob.

$$(|0\rangle, |0\rangle), (|1\rangle, |1\rangle), (|+\rangle, |+\rangle), (|-\rangle, |-\rangle), (|0\rangle, |1\rangle), (|1\rangle, |0\rangle), \quad (6)$$

$$(|+\rangle, |-\rangle), (|-\rangle, |+\rangle), (|0\rangle, |+\rangle), (|+\rangle, |0\rangle), (|1\rangle, |-\rangle),$$

$$(|-\rangle, |1\rangle), (|0\rangle, |-\rangle), (|-\rangle, |0\rangle), (|1\rangle, |+\rangle), (|+\rangle, |1\rangle)$$

It can be seen that the qubit pairs shown in Equation (6) indicate examples of all possible pairs configured using $\{|0\rangle, |1\rangle, |+\rangle, |-\rangle\}$.

Here, the authentication state may be represented by the following Equation (7):

$$|auth\rangle = [(|auth\rangle_1, |auth\rangle_1), (|auth\rangle_2, |auth\rangle_2), \ldots, (|auth\rangle_m, |auth\rangle_m)] \quad (7)$$

Further, in the case of the sending side Alice, the quantum state preparation unit 110 may prepare a verification state using the same scheme as the scheme for preparing the authentication state in order to check the security of a quantum channel.

Here, the verification state may be represented by the following Equation (8):

$$|chk\rangle = [(|chk\rangle_1, |chk\rangle_1), (|chk\rangle_2, |chk\rangle_2), \ldots, (|chk\rangle_l, |chk\rangle_l)] \quad (8)$$

Further, the quantum state preparation unit 110 may generate quantum states $|INI\rangle$ in which quantum qubit pairs corresponding to the message state, the authentication state, and the verification state are randomly mixed. The number of quantum qubit pairs constituting the quantum states $|INI\rangle$ may be n+m+l, obtained by summing the numbers of quantum qubit pairs corresponding to the message state, the authentication state, and the verification state.

That is, the newly generated quantum states may be represented by the following Equation (9):

$$|INI\rangle = [(|ini\rangle_1, |ini\rangle_1), (|ini\rangle_2, |ini\rangle_2), \ldots, (|ini\rangle_{n+m+l}, |ini\rangle_{n+m+l})] \quad (9)$$

where n may be the number of quantum qubit pairs prepared as the message state, m may be the number of quantum qubit pairs prepared as the authentication state, and l may be the number of quantum qubit pairs prepared as the verification state.

When the quantum states are transmitted to the communication partner and a message is received from the communication partner, the quantum state communication unit 120 may measure the quantum states of the message received from the communication partner.

Here, in the case of the sending side Alice, the quantum state communication unit 120 may transmit the quantum states $|INI\rangle$ to the receiving side Bob.

At this time, in the case of the receiving side Bob, the quantum state communication unit 120 may receive the quantum states $|INI\rangle$, and may measure individual qubit pairs included in the quantum states using $\sigma_{z-}$ basis and $\sigma_{x-}$ basis.

Here, the quantum state communication unit 120 may differently dispose the measurement bases for two qubits within one pair.

That is, when a first qubit within one pair is measured in the $\sigma_{z-}$ basis, the quantum state communication unit 120 may measure a second qubit in the $\sigma_{x-}$ basis.

This may be simply indicated by $(\sigma_z, \sigma_x)$.

Here, in the case of the receiving side Bob, the quantum state communication unit 120 may randomly select whether to measure one qubit pair using $(\sigma_z, \sigma_x)$ or using $(\sigma_x, \sigma_z)$, and may measure the qubit pair.

In this case, the results of measurement may be represented by the following Equation (10):

$$(O_1, O_2)_i \quad (10)$$

Here, it can be seen that i indicates the sequence number of one pair, among multiple pairs constituting $|INI\rangle$ (where $1 \leq i \leq (n+m+l)$).

It can be seen that $O_1$ indicates the result of measurement of a first qubit in one pair and $O_2$ indicates the result of measurement of a second qubit in the one pair (where $O_{1,2} \in \{0, 1, +, -\}$).

The authentication unit 130 may authenticate the communication partner based on determination of whether an authentication key previously shared with the communication partner is possessed using the authentication state.

Here, when a message is sent to the communication partner, the authentication unit 130 may notify the communication partner of the location of a qubit pair corresponding to the authentication state, among qubit pairs included in the quantum states, and may determine whether an authentication key previously shared with the communication partner is possessed using the results of an operation performed by the communication partner.

When a message is received from the communication partner, the authentication unit 130 may reveal, to the communication partner, the results obtained by performing an XOR operation between measurement results at the location of a qubit pair corresponding to an authentication state, notification of which is provided by the communication partner, and a key previously shared with the communication partner.

For example, in the case of the sending side Alice, the authentication unit 130 may notify the receiving side Bob of the location of the qubit pair corresponding to the authentication state, among qubit pairs constituting the $|INI\rangle$.

Here, in the case of the receiving side Bob, the authentication unit 130 may reveal the results of performing an XOR operation between measurement results at the location of the qubit pair corresponding to the authentication state, among the results of measurement of quantum states, and the authentication key $K_{AB}$ previously shared with the sending side Alice.

That is, the authentication unit 130 may reveal the results of performing the operation of the following Equation (11) on the measurement results at a location j corresponding to the authentication qubit pair.

$$(O_1 \oplus k_{ABi}, O_2 \oplus k_{ABi})_j \quad (11)$$

Here, XOR operations performed on the results of measurement in which $O_1$ or $O_2$ is + and − may be defined by $+\oplus 0 = +, -\oplus 0 = -, +\oplus 1 = -, -\oplus 1 = +$.

Here, in the case of the sending side Alice, the authentication unit 130 may determine whether the receiving side Bob possesses an authentication key $K_{AB}$ with reference to the results revealed by the receiving side Bob.

For example, the authentication unit 130 may assume that quantum states at the location j, at which the qubit pair corresponding to the authentication state is located, among quantum states $|INI\rangle$ transmitted by the sending side Alice, are $(|+\rangle, |-\rangle)$, and that the authentication bit $k_{ABj}$ to be applied to the corresponding location is $K_{AB}=1$.

In the case of the receiving side Bob, the authentication unit 130 may be configured to, if (+, 1) are obtained as the results of measurement performed using the basis pair $(\sigma_x, \sigma_z)$ at the location j, reveal (−, 0) by applying Equation (11) to (+, 1).

In the case of the sending side Alice, the authentication unit 130 may check the result of a first bit measured in the same basis as that of the initial state prepared by the quantum state preparation unit 110.

That is, when it is checked that the initial first quantum state $|+\rangle$ has been revealed as '−' by the receiving side Bob, the authentication unit 130 may confirm that the receiving side Bob knows that $k_{ABj}=1$.

Here, the authentication unit 130 may perform the above-described procedure on a total of m pairs prepared as the authentication state.

In this case, the probability of pairs not being authenticated, among the m pairs, may be ¼.

The reason for this is that half of states prepared by the sending side Alice as the authentication state are prepared in different bases (e.g. $|0\rangle, |-\rangle$), and thus the probability that, for the different bases, the measurement basis pair $((\sigma_z, \sigma_x)$ or $(\sigma_x, \sigma_z))$ selected by the receiving side Bob will be identical to the prepared bases is ½. If the bases are not identical to each other, authentication cannot be performed.

In this case, when authentication qubit pairs (about ¾m authentication qubit pairs) that can be authenticated have been successfully authenticated, among a total of m authentication qubit pairs corresponding to the authentication state in the quantum states, the authentication unit 130 may determine that the receiving side is the legitimate receiver Bob, and may request the verification unit 140 to verify a quantum channel, whereas when the authentication of the authentication qubit pairs fails, the authentication unit 130 may request the quantum state preparation unit 110 to prepare quantum states.

The verification unit 140 may verify the security of the quantum channel for communicating with the communication partner using the verification state.

When a message is sent to the communication partner, the verification unit 140 may notify the communication partner of the location of a qubit pair corresponding to the verification state, among qubit pairs included in the quantum states, and may determine the security of the quantum channel using the results of an operation performed by the communication partner.

When a message is received from the communication partner, the verification unit 140 may reveal the results of measurement performed using a verification basis at the location of a qubit pair corresponding to a verification state, notification of which is provided by the communication partner, to the communication partner.

Here, the verification unit 140 may check the results of measurement performed using the verification basis and the results of measurement performed using the same basis as that of the initial state prepared by the quantum state preparation unit 110, thus determining the security of the quantum channel.

For example, in the case of the sending side Alice, the verification unit 140 may notify the receiving side Bob of the location of a qubit pair corresponding to the verification state, among qubit pairs constituting the quantum states $|INI\rangle$.

In the case of the receiving side Bob, the verification unit 140 may reveal the results of measurement at the location of the qubit pair corresponding to the verification state.

Here, in the case of the sending side Alice, the verification unit 140 may check the results revealed by the receiving side Bob, and may then verify whether the states sent by the sending side Alice are restored without change by the receiving side Bob using a scheme similar to an authentication state determination scheme.

For example, in the case of the sending side Alice, when quantum states at the location 1 at which the qubit pair corresponding to the verification state is located, among the quantum states $|INI\rangle$, which are sent to the receiving side Bob, are $(|+\rangle, |-\rangle)$, the verification unit 140 on the receiving side Bob may reveal (+, 1) as the results of measurement performed using the basis pair $(\sigma_x, \sigma_z)$ at the location 1.

Here, in the case of the sending side Alice, the verification unit 140 may verify the security of the quantum channel by checking the results of first measurement performed using the same basis as that of the initial state prepared by the quantum state preparation unit 110.

Here, the probability of pairs not being verified, among l pairs, may be ¼.

The reason for this is that half of states prepared by the sending side Alice as the verification state are prepared in different bases (e.g. $(|0\rangle, |-\rangle)$), and thus the probability that for the different bases, the measurement basis pair $((\sigma_z, \sigma_x)$ or $(\sigma_x, \sigma_z))$ selected by the receiving side Bob will be identical to the prepared bases is ½. If the bases are not identical to each other, verification cannot be realized.

Here, in the case of the sending side Alice, when verification qubit pairs (about ¾l verification qubit pairs) that can be verified have been successfully verified, among a total of l verification qubit pairs corresponding to the verification state in the quantum states, the verification unit 140 may verify that the quantum channel is secure, and may request the message restoration unit 150 to restore the message, whereas when verification of the quantum channel fails, the verification unit 140 may request the quantum state preparation unit 110 to prepare quantum states.

The message restoration unit 150 may restore the message received from the communication partner using the message state.

When a message is received from the communication partner, the message restoration unit 150 may restore, as the message, measurement results at the location performed using the same basis as the preparation basis revealed by the communication partner, among the results of measurement performed on the remaining qubit pairs, other than the qubit pairs used for authentication of the communication partner in the quantum channel and for verification of security of the quantum channel, after the communication partner in the quantum channel has been authenticated and the security of the quantum channel has been verified.

For example, after both receiving-side authentication by the authentication unit 130 on the sending side Alice and the verification of the quantum channel by the verification unit 140 have been successfully performed, the message restoration unit 150 on the receiving side Bob may restore, as the message sent by the sending side Alice, the results of measurement performed using the same basis as the preparation basis revealed by the sending side Alice, among the measurement results of all qubit pairs in the quantum states, with the exception of the information about the locations of qubit pairs corresponding to the authentication state and the verification state that are revealed while passing through the previous steps.

Figure 3:
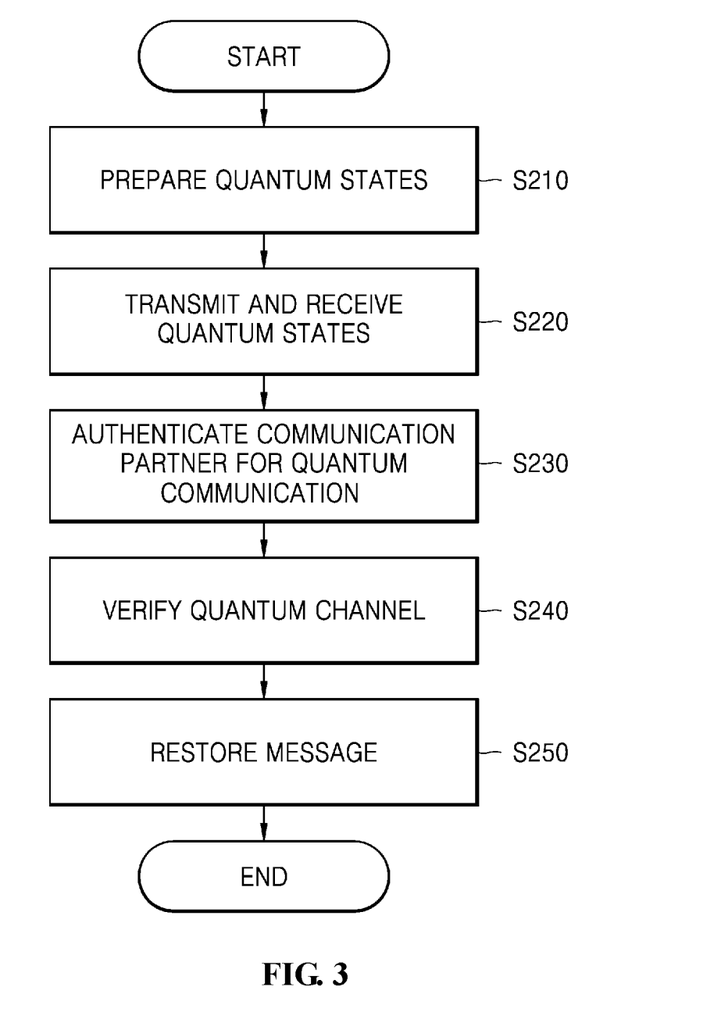
FIG. 3 is an operation flowchart illustrating a method for quantum direct communication using single qubits according to an embodiment of the present invention.

FIG. 3 is an operation flowchart illustrating a method for quantum direct communication using single qubits according to an embodiment of the present invention.

Referring to FIG. 3, the method for quantum direct communication using single qubits according to an embodiment of the present invention may prepare quantum states at step S210.

That is, at step S210, there can be prepared quantum states including a message state which is prepared using a pair of single qubits based on the message bit of a message to be sent to a communication partner, a authentication state which is prepared using random qubit pairs, and a verification state which is prepared using random qubit pairs.

At step S210, in the case of the sending side Alice, single qubit pairs may be provided depending on the message bit desired to be sent.

That is, at step S210, when the message bit desired to be sent is 0, $(|0\rangle, |0\rangle)$ or $(|+\rangle, |+\rangle)$ may be prepared.

At step S210, when the message bit desired to be sent is 1, $(|1\rangle, |1\rangle)$ or $(|-\rangle, |-\rangle)$ may be prepared.

At step S210, single qubit pairs depending on the message bit may be randomly selected.

For example, at step S210, when a message bit sequence is 11010, a message state, such as that shown in Equation (4), may be prepared.

Here, the message state may be represented by Equation (5).

Further, at step S210, in the case of the sending side Alice, quantum states obtained by randomly selecting one from among qubit pairs given in Equation (6) may be provided so as to authenticate the receiving side Bob.

It can be seen that the qubit pairs shown in Equation (6) indicate examples of all possible pairs configured using $\{|0\rangle, |1\rangle, |+\rangle, |-\rangle\}$.

Here, the authentication state may be represented by Equation (7).

Further, at step S210, in the case of the sending side Alice, there can be prepared a verification state using the same scheme as a scheme for preparing the authentication state so as to check the security of a quantum channel.

Here, the verification state may be represented by Equation (8).

At step S210, quantum states $|INI\rangle$ in which quantum qubit pairs corresponding to the message state, the authentication state, and the verification state are randomly mixed may be generated. The number of quantum qubit pairs constituting the quantum states $|INI\rangle$ may be n+m+l obtained by summing the numbers of quantum qubit pairs corresponding to the message state, the authentication state, and the verification state.

That is, the newly generated quantum states may be represented by Equation (9).

Here, n may be the number of quantum qubit pairs prepared as the message state, m may be the number of quantum qubit pairs prepared as the authentication state, and l may be the number of quantum qubit pairs prepared as the verification state.

Next, the method for quantum direct communication using single qubits according to the embodiment of the present invention may transmit and receive quantum states, and may measure the quantum states at step S220.

That is, at step S220, when the quantum states are transmitted to the communication partner and a message is received from the communication partner, the quantum states of the message received from the communication partner may be measured.

Here, at step S220, in the case of the sending side Alice, the quantum states $|INI\rangle$ may be transmitted to the receiving side Bob.

At step S220, in the case of the receiving side Bob, the quantum states $|INI\rangle$ may be received, and individual qubit pairs included in the quantum states may be measured using $\sigma_{z_-}$ basis and $\sigma_{x_-}$ basis.

At step S220, the measurement bases for two qubits may be differently disposed within one pair.

That is, at step S220, when a first qubit within one pair is measured in the $\sigma_{z_-}$ basis, a second qubit may be measured in the $\sigma_{x_-}$ basis.

This may be simply indicated by $(\sigma_z, \sigma_x)$.

Here, at step S220, in the case of the receiving side Bob, whether to measure one qubit pair using $(\sigma_z, \sigma_x)$ or using $(\sigma_x, \sigma_z)$ may be randomly selected, and then the qubit pair may be measured.

In this case, the results of measurement may be represented by Equation (10).

Here, it can be seen that i indicates the sequence number of one pair, among multiple pairs constituting $|INI\rangle$ (where $(1 \le i \le (n+m+l))$.

It can be seen that $O_1$ indicates the result of measurement of a first qubit in one pair and $O_2$ indicates the result of measurement of a second qubit in the one pair (where $O_{1,2} \in \{0, 1, +, -\}$).

Further, the method for quantum direct communication using single qubits according to the embodiment of the present invention may authenticate a communication partner for quantum communication at step S230.

That is, at step S230, the communication partner may be authenticated based on determination of whether an authentication key previously shared with the communication partner is possessed using the authentication state.

Here, at step S230, when a message is sent to the communication partner, the communication partner may be notified of the location of a qubit pair corresponding to the authentication state, among qubit pairs included in the quantum states, and it may be determined whether an authentication key previously shared with the communication partner is possessed using the results of an operation performed by the communication partner.

At step S230, when a message is received from the communication partner, the results obtained by performing an XOR operation between measurement results of the location of a qubit pair corresponding to an authentication state, notification of which is provided by the communication partner, and a key previously shared with the communication partner may be revealed to the communication partner.

At step S230, for example, in the case of the sending side Alice, notification of the location of the qubit pair corresponding to the authentication state, among qubit pairs constituting the $|INI\rangle$, may be provided to the receiving side Bob.

At step S230, in the case of the receiving side Bob, the results of performing an XOR operation between measurement results at the location of the qubit pair corresponding to the authentication state, among the results of measurement of quantum states, and the authentication key $K_{AB}$, previously shared with the sending side, may be revealed.

That is, at step S230, the results of performing the operation of the following Equation (11) on the measurement results at a location j corresponding to the authentication qubit pair may be revealed.

Here, XOR operations performed on the results of measurement in which $O_1$ or $O_2$ is + and − may be defined by $+\oplus 0 = +, -\oplus 0 = -, +\oplus 1 = -, -\oplus 1 = +$.

Here, at step S230, in the case of the sending side Alice, it may be determined whether the receiving side Bob possesses an authentication key $K_{AB}$ with reference to the results revealed by the receiving side Bob.

For example, at step S230, it may be assumed that quantum states at location j, at which the qubit pair corresponding to the authentication state is located, among quantum states $|INI\rangle$ transmitted by the sending side Alice, are $(|+\rangle, |-\rangle)$, and that the authentication bit $k_{ABj}$ to be applied to the corresponding location is $K_{AB}=1$.

At step S230, in the case of the receiving side Bob, if (+, 1) are obtained as the results of measurement performed using the basis pair $(\sigma_x, \sigma_z)$ at location j, (−, 0) may be revealed by applying Equation (11) to (+, 1).

At step S230, in the case of the sending side Alice, the result of a first bit measured in the same basis as that of the initial state prepared by Alice may be checked.

That is, at step S230, when it is checked that the initial first quantum state $|+\rangle$ has been revealed as '−' by the receiving side Bob, it may be confirmed that the receiving side Bob knows that $k_{ABj}=1$.

Here, at step S230, the above-described procedure may be performed on a total of m pairs prepared as the authentication state.

In this case, the probability of pairs not being authenticated, among the m pairs, may be ¼.

The reason for this is that half of states prepared by the sending side Alice as the authentication state are prepared in different bases (e.g. (|0⟩, |−⟩)), and thus the probability that, for the different bases, the measurement basis pair (($\sigma_z$, $\sigma_x$) or ($\sigma_x$, $\sigma_z$)) selected by the receiving side Bob will be identical to the prepared bases is ½. If the bases are not identical to each other, authentication cannot be performed.

In this case, at step S230, when authentication qubit pairs (about ¾m authentication qubit pairs) that can be authenticated have been successfully authenticated, among a total of m authentication qubit pairs corresponding to the authentication state in the quantum states, it may be determined that the receiving side is the legitimate receiver Bob, and the verification unit 140 may be requested to verify a quantum channel, whereas when the authentication of the authentication qubit pairs fails, the quantum state preparation unit 110 may be requested to prepare quantum states.

Next, the method for quantum direct communication using single qubits according to the embodiment of the present invention may verify a quantum channel at step S240.

That is, at step S240, the security of the quantum channel for communicating with the communication partner may be verified using the verification state.

At step S240, when a message is sent to the communication partner, the communication partner may be notified of the location of a qubit pair corresponding to the verification state, among qubit pairs included in the quantum states, and the security of the quantum channel may be determined using the results of an operation performed by the communication partner.

At step S240, when a message is received from the communication partner, the results of measurement performed using a verification basis at the location of a qubit pair corresponding to a verification state, notification of which is provided by the communication partner, may be revealed to the communication partner.

At step S240, the results of measurement performed using the verification basis and the results of measurement performed using the same basis as that of the initial state prepared by the sending side Alice may be checked, and thus the security of the quantum channel may be determined.

At step S240, for example, in the case of the sending side Alice, notification of the location of a qubit pair corresponding to the verification state, among qubit pairs constituting the quantum states |INI⟩, may be provided to the receiving side Bob.

At step S240, in the case of the receiving side Bob, the results of measurement at the location of the qubit pair corresponding to the verification state may be revealed.

At step S240, in the case of the sending side Alice, the results revealed by the receiving side Bob may be checked, and then whether the states sent by the sending side Alice are restored without change by the receiving side Bob may be verified using a scheme similar to an authentication state determination scheme.

At step S240, for example, in the case of the sending side Alice, when quantum states at the location Q at which the qubit pair corresponding to the verification state is located, among the quantum states |INI⟩, which are sent to the receiving side Bob, are (|+⟩, |−⟩), the receiving side Bob may reveal (+, 1) as the results of measurement performed using the basis pair ($\sigma_x$, $\sigma_z$) at the location l.

Here, at step S240, in the case of the sending side Alice, the security of the quantum channel may be verified by checking the results of first measurement performed using the same basis as that of the initial state prepared by the sending side Alice.

Here, the probability of pairs not being verified, among l pairs, may be ¼.

The reason for this is that half of states prepared by the sending side Alice as the verification state are prepared in different bases (e.g. (|0⟩, |−⟩)), and thus the probability that, for the different bases, the measurement basis pair (($\sigma_z$, $\sigma_x$) or ($\sigma_x$, $\sigma_z$)) selected by the receiving side Bob will be identical to the prepared bases is ½. If the bases are not identical to each other, verification cannot be realized.

Here, at step S240, in the case of the sending side Alice, when verification qubit pairs (about ¾l verification qubit pairs) that can be verified have been successfully verified, among a total of l verification qubit pairs corresponding to the verification state in the quantum states, it may be verified that the quantum channel is secure, and the message restoration unit 150 may be requested to restore the message, whereas when verification of the quantum channel fails, the quantum state preparation unit 110 may be requested to prepare quantum states.

Furthermore, the method for quantum direct communication using single qubits according to the embodiment of the present invention may restore a message at step S250.

That is, at step S250, the message received from the communication partner may be restored using the message state.

At step S250, when a message is received from the communication partner, measurement results at the location performed using the same basis as the preparation basis revealed by the communication partner, among the results of measurement performed on the remaining qubit pairs, other than the qubit pairs used for authentication of the communication partner in the quantum channel and for verification of security of the quantum channel, may be restored as the message after the communication partner in the quantum channel has been authenticated and the security of the quantum channel has been verified.

For example, after both receiving-side authentication by the authentication unit 130 on the sending side Alice and the verification of the quantum channel by the verification unit 140 have been successfully performed, the message restoration unit 150 on the receiving side Bob may restore, as the message sent by the sending side Alice, the results of measurement performed using the same basis as the preparation basis revealed by the sending side Alice, among the measurement results of all qubit pairs in the quantum states, with the exception of the information about the locations of qubit pairs corresponding to the authentication state and the verification state that are revealed while passing through the previous steps.

The apparatus and method for quantum direct communication using single qubits according to an embodiment of the present invention may establish quantum states prepared by Alice so that the quantum states have a non-orthogonal relationship so as to enhance the security of quantum communication.

Here, in the apparatus and method for quantum direct communication using single qubits, the configuration of quantum state pairs used in an authentication mode and in a verification mode may be different from the configuration of quantum state pairs in a message mode.

In particular, the apparatus and method for quantum direct communication using single qubits may prevent an external attacker from identifying and distinguishing the authentication mode, the verification mode, and the message mode before Alice reveals the corresponding modes.

In this case, the intervention of the external attacker may change quantum states, and thus the existence of the external attacker may be exposed when the change in the quantum states in the authentication mode and in the verification mode is recognized.

For example, it may be assumed that an attacker Eve intends to intercept information in the middle of a quantum channel. This may be referred to as an "intercept and resend attack". Eve may intercept the quantum states $|INI\rangle$ sent by Alice, and may randomly select a measurement basis in the same manner as Bob, perform measurement, and send $|INI\rangle'$ to Bob.

In this case, the quantum states may have the relationship shown in the following Equation (12):

$$|INI\rangle \neq |INI\rangle' \qquad (12)$$

The reason for this is that, when $|INI\rangle$ sent by Alice is measured by Bob, the measurement basis ($O_{z\_}$ or $O_{x\_}$ basis) selected by Alice is not known, and thus the initial state is not maintained due to the nature of quantum properties. For example, when a quantum state at a specific location constituting the quantum states $|INI\rangle$ transmitted by Alice is $|+\rangle$, it can be seen that the quantum state has been prepared in the $O_{x\_}$ basis. If the external attacker Eve who does not know the prepared quantum state measures the quantum state in the $O_{z\_}$ basis, the corresponding quantum state may be transformed into the state of $|0\rangle$ or $|1\rangle$. This transformation may have the relationship given in Equation (12).

The most effective attack method made by Eve disguises the corresponding attack as loss caused by a channel by resending the quantum state to Bob only when the results of the quantum state measured for a transmitted qubit pair are identically decoded, and by not sending quantum states in the remaining cases. Here, the identical decoding may mean that, even if the quantum states are different from each other depending on the basis, when the quantum states are decoded to bits, the same bit is indicated as the result of decoding, as in the case where $|0\rangle$ and $|+\rangle$ equally mean 0 bits.

In order to analyze security, attacker detection probabilities of respective qubit pairs used in the authentication state and in the verification state are described. The total number of types of qubit pairs used in the authentication state and in the verification state is 16. The types are shown in Equation (6).

First, the case where Alice transmits quantum states ($|0\rangle$, $|0\rangle$) may be analyzed. This may be equally applied to the case where Alice transmits ($|1\rangle$, $|1\rangle$), ($|+\rangle$, $|+\rangle$), and ($|-\rangle$, $|1\rangle$). When these states are intercepted by Eve in the middle of communication, and ($\sigma_x$, $\sigma_z$) is selected between basis pairs ($\sigma_z$, $\sigma_x$) and ($\sigma_x$, $\sigma_z$), the case where the quantum states sent by Alice are not restored by separating the quantum states into a first quantum state measured in the $O_{x\_}$ basis and a second quantum state measured in the $O_{z\_}$ basis are not restored may be assumed. Since the second quantum state $|0\rangle$ measured in the $O_{z\_}$ basis by Eve is prepared in the same basis as Alice, the result of measurement by Eve becomes $|0\rangle$. In contrast, since Eve measures the first quantum state in $O_{x\_}$ basis, which is different from that of Alice, the quantum state may be resent to Bob at a probability of ½. The reason why the quantum state is not resent at a probability of ½ is that the results of decoding the first measurement result and the second measurement result are not identical to each other. This case corresponds to the case where the results of measurement are ($|-\rangle$, $|0\rangle$). The case where Eve resends the quantum states is the case where the results of measurement are ($|+\rangle$, $|0\rangle$). Bob may receive the quantum state pair ($|+\rangle$, $|0\rangle$), and may randomly select one pair between ($\sigma_z$, $\sigma_x$) and ($\sigma_x$, $\sigma_z$) (i.e., at a probability of ½) and measure the quantum states. In this case, when Bob selects the basis pair ($\sigma_x$, $\sigma_z$), the presence of Eve cannot be detected, but, when Bob selects the basis pair ($\sigma_z$, $\sigma_x$), the presence of Eve can be detected at a probability of ½. In the entire process, the probability that Bob will detect Eve may be represented by the following Equation (13):

$$\tfrac{1}{2} \times \tfrac{1}{2} \times \tfrac{1}{2} = \tfrac{1}{8} \qquad (13)$$

When the remaining 12 pairs are also analyzed using a method similar to the above-described method, it can be seen that a detection probability of ⅛ is obtained for each of the pairs. That is, when a total of m+l authentication and verification pairs are used, the probability that Eve will be detected may be represented by the following Equation (14):

$$1 - \left(1 - \frac{1}{8}\right)^{m+l} \qquad (14)$$

In this case, when m+l is sufficiently large, the probability may approach 1. That is, through a sufficient number of authentication and verification pairs, Eve may be detected with 100% certainty. For security, when Eve is detected in advance by sufficiently increasing m, which is the number of authentication pairs, so as to enhance security, the leakage of messages may be minimized.

Figure 4:
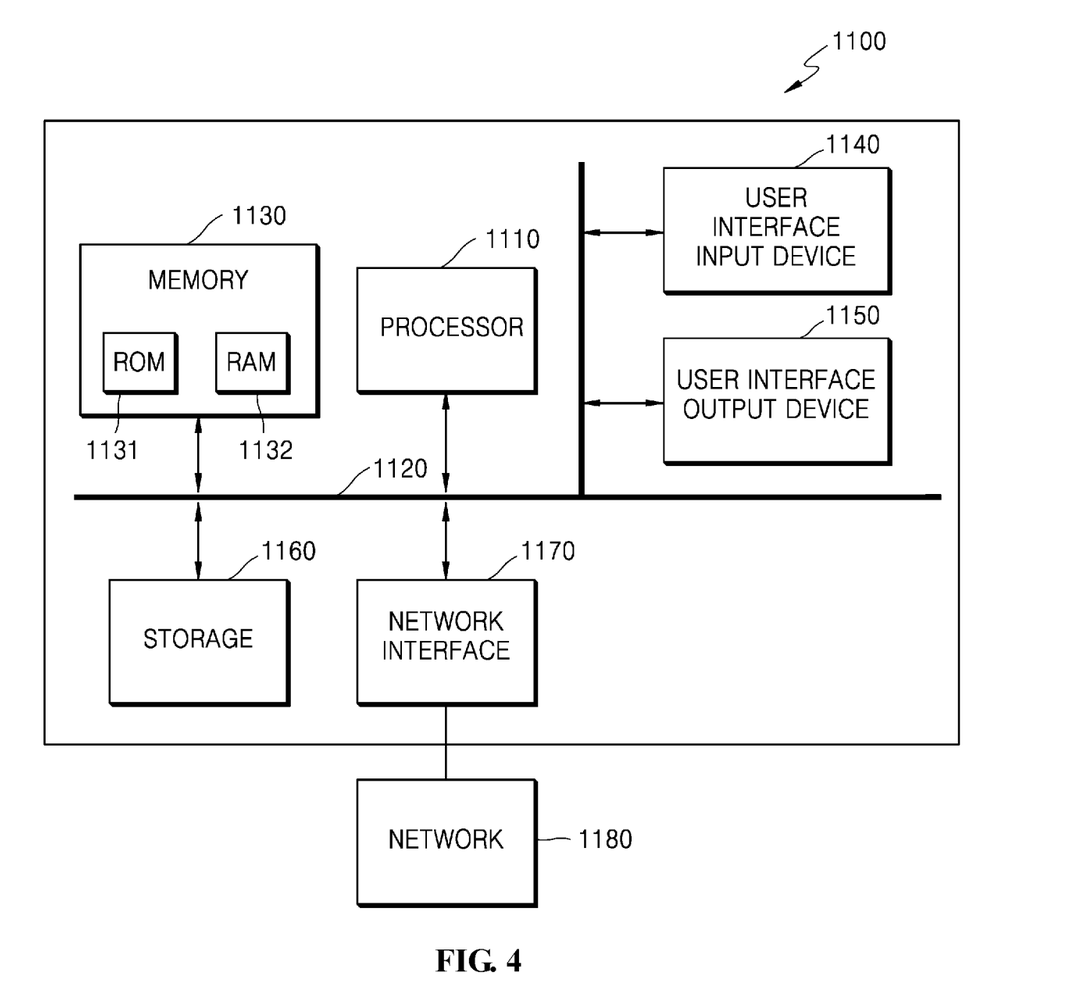
FIG. 4 is a diagram illustrating a computer system according to an embodiment of the present invention.

FIG. 4 is a diagram illustrating a computer system according to an embodiment of the present invention.

Referring to FIG. 4, an apparatus for quantum direct communication using single qubits according to an embodiment of the present invention may be implemented in a computer system 1100 such as a computer-readable storage medium. As shown in FIG. 4, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The present invention can provide secure communication without information previously shared between two users who desire communication by utilizing quantum states.

Further, the present invention can propose an apparatus and method that enable quantum direct communication to be easily implemented.

Furthermore, the present invention can provide secure communication between legitimate users by integrating entity authentication with a quantum direct communication technique.

As described above, in the apparatus and method for quantum direct communication using single qubits according to the present invention, the configurations and schemes in the above-described embodiments are not limitedly applied, and some or all of the above embodiments can be selectively combined and configured such that various modifications are possible.

What is claimed is:

1. An apparatus for quantum direct communication using single qubits, comprising:
   a quantum state preparation unit for preparing quantum states including a message state, an authentication state, and a verification state, wherein the message state is prepared using pairs of single qubits based on a message bit of a message to be sent to a communication partner, the authentication state is prepared using random qubit pairs, and the verification state is prepared using random qubit pairs;
   a quantum state communication unit for transmitting the quantum states to the communication partner, and measuring a quantum state of a message received from the communication partner when the message is received from the communication partner;
   an authentication unit for authenticating the communication partner based on determination of whether an authentication key previously shared with the communication partner is possessed using the authentication state;
   a verification unit for verifying security of a quantum channel for communicating with the communication partner using the verification state; and
   a message restoration unit for restoring the message received from the communication partner using the message state.

2. The apparatus of claim 1, wherein the quantum state preparation unit prepares quantum states in which quantum qubit pairs corresponding to the message state, quantum qubit pairs corresponding to the authentication state, and quantum qubit pairs corresponding to the verification state are randomly mixed.

3. The apparatus of claim 1, wherein the authentication unit is configured to, when a message is sent to the communication partner, notify the communication partner of a location of a qubit pair corresponding to the authentication state, among qubit pairs included in the quantum states, and determine whether the authentication key previously shared with the communication partner is possessed based on results of performing an operation by the communication partner.

4. The apparatus of claim 3, wherein the authentication unit is configured to, when a message is received from the communication partner, reveal results of performing an XOR operation between measurement results at the location of the qubit pair corresponding to the authentication state, notification of which is provided by the communication partner, and the authentication key previously shared with the communication partner, to the communication partner.

5. The apparatus of claim 1, wherein the verification unit is configured to, when a message is sent to the communication partner, notify the communication partner of a location of a qubit pair corresponding to the verification state, among qubit pairs included in the quantum states, and determine security of the quantum channel using results of performing an operation by the communication partner.

6. The apparatus of claim 5, wherein the verification unit is configured to, when a message is received from the communication partner, reveal results of measurement performed using a verification basis at a location of a qubit pair corresponding to the verification state, notification of which is provided by the communication partner, to the communication partner.

7. The apparatus of claim 6, wherein the verification unit is configured to check results of measurement performed using the verification basis and results of measurement performed using a basis identical to that of an initial state prepared by the quantum state preparation unit, thus determining security of the quantum channel.

8. The apparatus of claim 1, wherein the message restoration unit is configured such that, when a message is received from the communication partner, results of measurement at a location performed using a basis identical to a preparation basis revealed by the communication partner, among results of measurement of remaining qubit pairs, are restored as the message, after the communication partner has been authenticated and security of the quantum channel has been verified, wherein the remaining qubit pairs are qubit pairs other than a qubit pair used for authentication of the communication partner in the quantum channel and a qubit pair used for verification of security of the quantum channel.

9. A method for quantum direct communication using single qubits, the method being performed by an apparatus for quantum direct communication using single qubits, the method comprising:
   preparing quantum states including a message state, an authentication state, and a verification state, wherein the message state is prepared using pairs of single qubits based on a message bit of a message to be sent to a communication partner, the authentication state is prepared using random qubit pairs, and the verification state is prepared using random qubit pairs;
   transmitting the quantum states to the communication partner, and measuring a quantum state of a message received from the communication partner when the message is received from the communication partner;
   authenticating the communication partner based on determination of whether an authentication key previously shared with the communication partner is possessed using the authentication state;
   verifying security of a quantum channel for communicating with the communication partner using the verification state; and
   restoring the message received from the communication partner using the message state.

10. The method of claim 9, wherein preparing the quantum states is configured to prepare quantum states in which quantum qubit pairs corresponding to the message state, quantum qubit pairs corresponding to the authentication state, and quantum qubit pairs corresponding to the verification state are randomly mixed.

11. The method of claim 9, wherein authenticating the communication partner is configured to, when a message is sent to the communication partner, notify the communication partner of a location of a qubit pair corresponding to the authentication state, among qubit pairs included in the quantum states, and determine whether the authentication key previously shared with the communication partner is possessed based on results of performing an operation by the communication partner.

12. The method of claim 11, wherein authenticating the communication partner is configured to, when a message is received from the communication partner, reveal results of performing an XOR operation between measurement results at the location of the qubit pair corresponding to the authentication state, notification of which is provided by the communication partner, and the authentication key previously shared with the communication partner, to the communication partner.

13. The method of claim 9, wherein verifying the security of the quantum channel is configured to, when a message is sent to the communication partner, notify the communication partner of a location of a qubit pair corresponding to the verification state, among qubit pairs included in the quantum states, and determine security of the quantum channel using results of performing an operation by the communication partner.

14. The method of claim 13, wherein verifying the security of the quantum channel is configured to, when a message is received from the communication partner, reveal results of measurement performed using a verification basis at a location of a qubit pair corresponding to the verification state, notification of which is provided by the communication partner, to the communication partner.

15. The method of claim 14, wherein verifying the security of the quantum channel is configured to check results of measurement performed using the verification basis and results of measurement performed using a basis identical to that of an initial state prepared by a quantum state preparation unit, thus determining security of the quantum channel.

16. The method of claim 9, wherein restoring the message is configured such that, when a message is received from the communication partner, results of measurement at a location performed using a basis identical to a preparation basis revealed by the communication partner, among results of measurement of remaining qubit pairs, are restored as the message, after the communication partner has been authenticated and security of the quantum channel has been verified, wherein the remaining qubit pairs are qubit pairs other than a qubit pair used for authentication of the communication partner in the quantum channel and a qubit pair used for verification of security of the quantum channel.

* * * * *